United States Patent
Cairns

(10) Patent No.: US 7,668,226 B2
(45) Date of Patent: Feb. 23, 2010

(54) METHOD AND APPARATUS FOR ESTIMATING GAIN OFFSETS FOR AMPLITUDE-MODULATED COMMUNICATION SIGNALS

(75) Inventor: Douglas Cairns, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 731 days.

(21) Appl. No.: 11/064,351

(22) Filed: Feb. 23, 2005

(65) Prior Publication Data

US 2006/0188006 A1 Aug. 24, 2006

(51) Int. Cl.
H04B 1/00 (2006.01)
(52) U.S. Cl. ........................ 375/148; 375/320; 375/150; 375/136; 375/147
(58) Field of Classification Search ................. 375/136, 375/147, 148, 150, 320
See application file for complete search history.

(56) References Cited

U.S. PATENT DOCUMENTS

| | | | |
|---|---|---|---|
| 5,852,630 A * | 12/1998 | Langberg et al. ............. | 375/219 |
| 6,430,214 B1 | 8/2002 | Jalloul et al. | |
| 6,671,268 B2 | 12/2003 | Leung | |
| 6,975,672 B2 * | 12/2005 | Bottomley et al. .......... | 375/148 |
| 7,020,791 B1 * | 3/2006 | Aweya et al. ................ | 713/400 |
| 7,154,966 B2 * | 12/2006 | Malm et al. .................. | 375/340 |
| 7,170,924 B2 * | 1/2007 | Corbaton et al. ............. | 375/148 |
| 7,269,205 B2 * | 9/2007 | Wang .......................... | 375/148 |
| 7,315,578 B2 * | 1/2008 | Cheng ......................... | 375/261 |
| 2002/0141486 A1 * | 10/2002 | Bottomley et al. ........... | 375/148 |
| 2003/0133520 A1 | 7/2003 | Jayaraman et al. | |
| 2003/0156563 A1 | 8/2003 | Papasakellariou et al. | |
| 2004/0028121 A1 * | 2/2004 | Fitton ........................... | 375/144 |
| 2004/0048619 A1 | 3/2004 | Kim et al. | |
| 2004/0264591 A1 * | 12/2004 | Malm et al. .................. | 375/261 |
| 2005/0282500 A1 * | 12/2005 | Wang et al. ............. | 455/67.13 |
| 2006/0126761 A1 * | 6/2006 | Bernhardsson et al. ...... | 375/340 |

(Continued)

FOREIGN PATENT DOCUMENTS

EP 1422896 5/2004

(Continued)

OTHER PUBLICATIONS

U.S. Appl. No. 10/672,492 to Wang.

(Continued)

Primary Examiner—Shuwang Liu
Assistant Examiner—Kenneth Lam
(74) Attorney, Agent, or Firm—Coats & Bennett, P.L.L.C.

(57) ABSTRACT

A method of processing an amplitude-modulated traffic signal involves the determination of a gain offset between the traffic signal and a reference signal, e.g., a pilot signal, received in association with the traffic signal, based on relating values known or determined from the reference signal to that gain offset. For example, in at least one embodiment of a wireless communication receiver, one or more processing circuits are configured to compute the gain offset based on the average magnitude of estimated traffic symbols and a signal-to-noise ratio. The received traffic symbols can be estimated using soft combining weights calculated from the reference signal, as can the signal-to-noise ratio. With the gain offset thus determined, the estimated traffic symbols can be scaled properly for subsequent processing, such as in log-likelihood ratio processing to recover the traffic signal data.

23 Claims, 2 Drawing Sheets

U.S. PATENT DOCUMENTS

2006/0171451 A1* 8/2006 Pietraski et al. ............. 375/232

FOREIGN PATENT DOCUMENTS

| | | |
|---|---|---|
| JP | 2004166004 | 6/2004 |
| WO | WO 2004049661 A1 * | 6/2004 |

OTHER PUBLICATIONS

"Signalling of CPICH and DSCH Power Ratio for M-ary Demodulation", TSG-RAN Working Group 1, Meeting #16. Sep. 10-13, 2000.

"A method for Blind Determination of Pilot to Data Power Ration for QAM Signals", TSG-RAN Working Group 1, Meeting #21, Aug. 2001.

* cited by examiner

METHOD AND APPARATUS FOR ESTIMATING GAIN OFFSETS FOR AMPLITUDE-MODULATED COMMUNICATION SIGNALS

BACKGROUND OF THE INVENTION

The present invention generally relates to communication signal processing, and particularly relates to processing amplitude-modulated communication signals.

Communication signals as used in typical wireless communication systems commonly convey information via time-varying modulations in their frequency, or phase, or amplitude, or in some combination of those parameters. For example, the Wideband Code Division Multiple Access (W-CDMA) standards define a high-speed downlink channel referred to in the past as the High Speed Downlink Packet Access (HSDPA) channel, but more recently referred to as the High Speed Downlink Shared Channel (HS-DSCH). Transmissions on the HS-DSCH use either Quadrature Phase Shift Keying (QPSK) or 16-ary Quadrature Amplitude Modulation (16QAM), depending on the data rate needed.

At the receiver, turbo decoding generally is used, at least for decoding traffic symbols modulated according to the 16QAM format. Since turbo decoding depends on having accurate "soft" symbol information, the receipt of amplitude-modulated traffic symbols imposes significant signal processing challenges. More particularly, the receiver generally must have an amplitude reference for the received traffic signal, so that the as-received amplitude of the traffic signal can be properly referenced for symbol detection and soft information determination.

Obtaining an amplitude reference for the received traffic signal may be achieved by transmitting additional information to the receiver, but the additional signaling overhead required for that approach represents just one of the disadvantages of such schemes. Other approaches to determining an amplitude reference for the traffic signal involve relatively complex calculations, and/or involve assumed or modeled values relating the traffic and pilot signals. In the first case, maintaining a reasonably accurate amplitude reference imposes significant computational overhead on the receiver's signal processing elements. In the second case, the amplitude reference calculated by the receiver is no better than the accuracy or appropriateness of the assumed or modeled values.

Of course, the above challenges are not limited to WCDMA-based communication networks, or to 16QAM signal formats. For example, similar challenges may arise in the context of cdma2000-based systems, at least for certain signaling formats defined by the cdma2000 air interface standards. More generally, the ability to determine accurate amplitude references is needed by all receivers adapted for the demodulation of signals having higher-order amplitude modulation formats, or otherwise adapted for high data rate applications where soft value information is needed for accurate symbol decoding.

SUMMARY OF THE INVENTION

In at least one embodiment of the present invention, a wireless communication receiver, such as a mobile station or other type of portable terminal, implements a method of processing an amplitude-modulated traffic signal based on relating the gain offset between the traffic signal and a received reference signal to values known or computed from the reference signal. The reference signal may be a pilot signal transmitted at a constant power, for example. Thus, in one aspect, a method of processing the traffic signal comprises calculating a gain offset between the traffic signal and the reference signal based on a first signal-to-noise ratio determined from the reference signal and an average magnitude of the estimated traffic symbols. The estimated traffic symbols then may be scaled based on the gain offset to obtain scaled estimated traffic symbols for subsequent processing. Scaling in this manner "corrects" the soft value information of the estimated traffic symbols and thus improves subsequent decoding performance.

According to the above method, or variations of it, the estimated traffic symbols may be generated by combining despread values of the traffic signal using soft combining weights determined from the reference signal. More particularly, generating estimated traffic symbols may comprise determining channel estimates and noise correlations from the reference signal, generating the soft combining weights as a function of the noise correlations and channel estimates, and combining despread values of the traffic signal taken over one or more symbol times of the reference signal using the soft combining weights to obtain the estimated traffic symbols. Note that in RAKE receiver embodiments of the wireless communication receiver, channel estimation and the determination of noise correlations for combining weight determination represent ongoing signal processing operations that are exploited for the computationally efficient gain offset determination methods taught herein.

In one embodiment of those methods, relating the gain offset to values known or derivable from the reference signal, e.g., a pilot signal, comprises relating the average magnitude of the estimated traffic symbols and a first signal-to-noise ratio determined from the reference signal to the gain offset. More particularly, the receiver is configured to express the unknown gain offset as the square root of a difference value divided by the first signal-to-noise ratio squared, said difference value calculated as the average magnitude of the estimated traffic symbols minus the first signal-to-noise ratio. That computational expression exploits the soft combining weights calculated from the reference signal, which are used for RAKE-combining the despread values of the traffic signal to obtain the estimated traffic symbols, and further exploits the signal-to-noise ratio calculation that may be made for the reference signal.

Thus, one or more embodiments of a wireless communication receiver include one or more processing circuits configured to calculate a gain offset between the traffic signal and the reference signal based on an average magnitude of the estimated traffic symbols and a first signal-to-noise ratio determined from the reference signal, and scale the estimated traffic symbols based on the gain offset to obtain scaled estimated traffic symbols for subsequent processing. The same processing circuit(s) may be configured to generate estimated traffic symbols for the traffic signal based on soft combining weights determined from the reference signal, or they may be associated with a circuit configured to provide estimated traffic symbols for scaling.

By way of non-limiting example, a gain compensation circuit may be disposed in the signal-processing path between a RAKE receiver circuit and a decoding circuit. The RAKE receiver circuit may be configured to generate despread values for the reference signal and the traffic signal, and use the despread values of the reference signal to estimate the channel, generate soft combining weights, and make an initial signal-to-noise ratio calculation. Then, the soft combining weights may be used to estimate the received traffic channel symbols, which are then used by the gain compensation circuit, along with the initial signal-to-noise ratio estimate, to calculate the gain offset between the reference signal and the traffic signal.

While such methods and apparatus are not limited to W-CDMA embodiments, the reference signal may comprise a W-CDMA pilot signal and the traffic signal may comprise a HS-DSCH signal transmitted using a 16QAM format, or some other amplitude-modulated format. As such, in at least one embodiment, the wireless communication receiver comprises a mobile station that includes hardware and/or software, e.g., program instructions stored in memory, configured to implement gain offset calculation according to the above methods, or variations thereof.

Of course, it should be understood that the present invention is not limited to the above features and advantages. Indeed, those skilled in the art will recognize additional features and advantages upon reading the following detailed discussion, and upon viewing the accompanying figures.

DETAILED DESCRIPTION OF THE INVENTION

Figure 1:
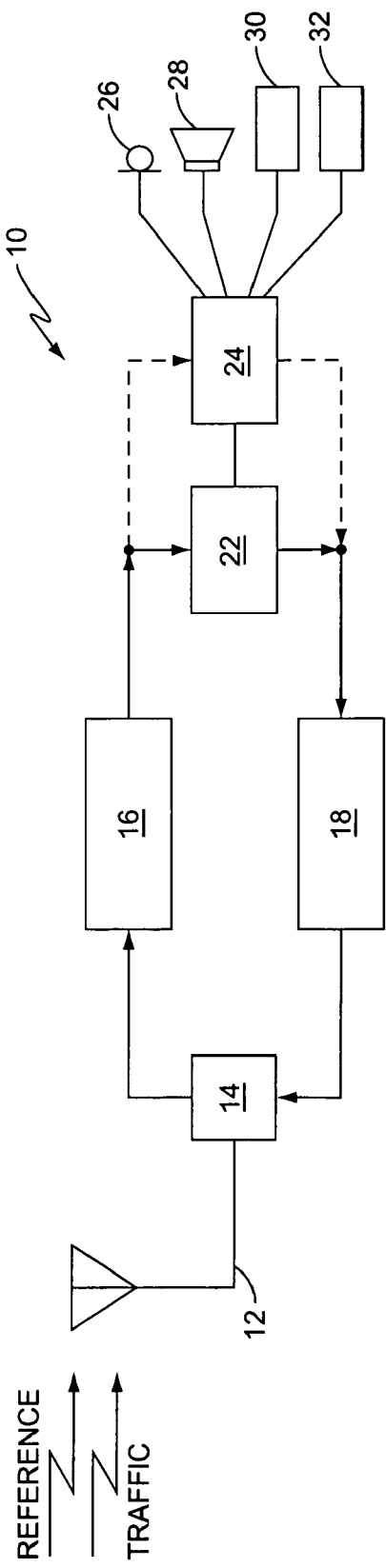
FIG. 1 is a block diagram of one embodiment of a wireless communication receiver that is configured to calculate a gain offset between an amplitude-modulated traffic signal and a reference signal received in association with the traffic signal.

FIG. 1 is a block diagram of an embodiment of a wireless communication receiver 10 that is configured to calculate the gain offset between a received traffic signal that is amplitude modulated, and a received reference signal, which may have been transmitted at a constant power. As used herein, the term "traffic signal" broadly connotes any modulated information signal that conveys control data, user data, etc. By way of non-limiting example, the receiver 10 actually may comprise a portable communication device that includes both receiver and transmitter functions, and may offer additional user interface functions, depending on its intended purpose.

For example, in one embodiment, the wireless communication receiver 10 comprises a mobile station or other type of portable communication device or handset that is configured for use in a wireless communication network based on the W-CDMA standards. As such, the reference signal received at the wireless communication receiver 10 may comprise a Common Pilot Channel (C-PICH) signal transmitted at a constant power, and the traffic signal received at the wireless communication receiver 10 may comprise a HS-DSCH signal, transmitted at a variable gain offset relative to the C-PICH. In at least one embodiment, the reference signal carries traffic symbols modulated according to the 16QAM format.

With these examples in mind, the illustrated embodiment of the wireless communication receiver 10 comprises a transmit/receive antenna assembly 12, a switch (and/or duplexer) element 14, a receiver circuit 16, a transmitter circuit 18, a system controller 22, one or more Input/Output (I/O) interface circuits 24, a microphone 26, a speaker 28, a keypad 30, and a display screen 32. The receiver circuit 16 may comprise a mix of analog and digital circuits, and includes baseband digital signal processing circuitry in at least one embodiment. Similarly, the transmitter circuit 18 may include a mix of analog and digital circuits, and includes baseband digital signal processing circuitry in at least one embodiment.

The system controller 22 may comprise a microprocessor, Digital Signal Processor (DSP), Field Programmable Gate Array (FPGA), Application Specific Integrated Circuit (ASIC), or other digital logic circuit, and may be implemented apart from the baseband processing circuits of the receiver and transmitter circuits 16 and 18, respectively, or may integrated with such circuits. In either case, it should be understood that the wireless communication receiver 10 generally includes one or more memory devices, for storing default parameters, provisioning information, and program instructions for system control, signal processing, etc.

Figure 2:
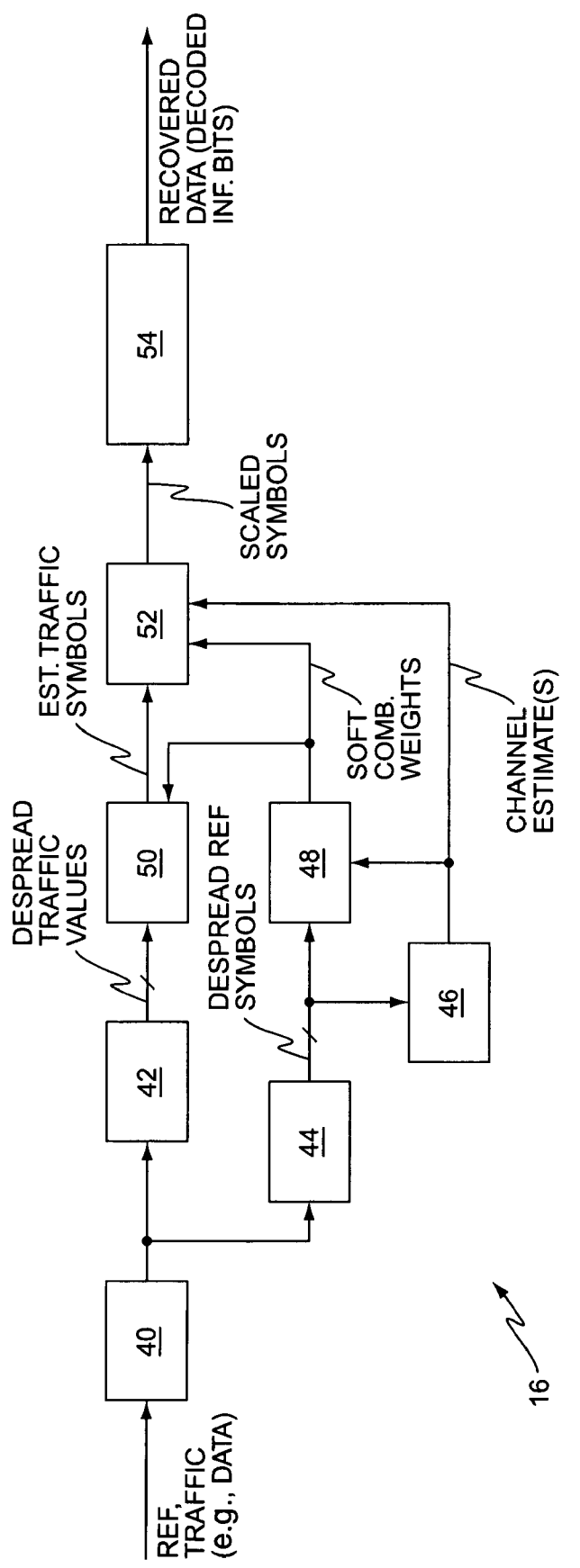
FIG. 2 is a block diagram of one embodiment of a receiver circuit, including RAKE receiver processing elements, for use in the wireless communication receiver of FIG. 1.

FIG. 2 provides a more detailed block diagram of one embodiment of the receiver circuit 16, wherein it comprises a receiver front-end 40, a traffic signal despreader circuit 42, a reference signal despreader circuit 44, a channel estimation circuit 46, a combining weight generator 48, a combining circuit 50, a gain compensation circuit 52, and a decoding circuit 54. Not all operational details of the illustrated processing elements are germane to understanding gain compensation as carried out by the gain compensation circuit 52, but it may be helpful to quickly step through the receiver circuit's overall signal processing operations.

In at least one embodiment, the reference and traffic signals are received as a composite CDMA signal, having separately coded channel components. The composite signal generally is filtered and amplified as needed by the receiver front-end circuit 40, and converted to a stream of digital samples. These digital samples are provided as inputs to the traffic and reference signal despreading circuits 42 and 44, respectively.

The reference signal despreading circuit 44 comprises one or more correlators that generally can be aligned with one or more multipath delay components of the received composite signal. By using the Walsh code of the reference signal (e.g., a Pilot Channel code), the despreading circuit 44 outputs despread values of the reference signal, which are used by the channel estimation circuit 46 to generate an estimate of the propagation channel, and used by the combining weight generator 48 to generate soft combining weights.

The receiver circuit 16 may be configured to operate as a "Generalized" RAKE receiver (G-RAKE). More particularly, the combining weight generator 48 may be configured for operation according to G-RAKE receiver processing, wherein the soft combining weights are generated in consideration of noise cross-correlations across the individual correlators of the despreading circuits 42, so that the soft combining weights effect interference suppression as part of RAKE combining operations. In another embodiment, the combining weight generator 48 is configured for operation according to "RAKE+" (RAKE "plus") receiver processing, wherein the soft combining weights are generated in consideration of the noise power statistics—i.e., the diagonal elements of a noise correlation matrix corresponding to the set of correlators in the despreading circuit 42. One may refer to U.S. patent application Ser. No. 09/344,899 to Wang et. al., filed 25 Jun. 1999, and to U.S. patent application Ser. No. 09/165,647 to Bottomley, filed 2 Oct. 1998, for more detailed background information regarding interference and noise suppression in RAKE receivers.

The combining circuit 50 combines the despread values of the traffic signal, as output by the correlators of the despreading circuit 42, using the soft combining weights generated by the combining weight generator 48, and outputs RAKE combined sample values that comprise estimates of the traffic symbols received in the traffic signal. Thus, despreading circuits 42 and 44, the channel estimator 46, the combining weight generator 48, and the combining circuit 50, collectively function as a RAKE receiver circuit comprising part of the larger receiver circuit 16. It should be understood that additional elements may be present in the receiver circuit 16, such as delay searcher circuits, finger placement circuits, etc., that are not illustrated for clarity.

The traffic signal generally is transmitted at a variable gain offset relative to the reference signal. Therefore, because the soft combining weights are determined from the reference signal rather than from the traffic signal, the soft value information embodied in the estimated traffic will be incorrect unless properly scaled. While the time-varying gain offset used for transmitting the traffic signal generally is unknown to the wireless communication receiver 10, the gain compensation circuit 52 is configured to calculate a dynamic estimate of the gain offset, and to scale the estimated traffic symbols output from the (RAKE) combining circuit 50 based on the estimated gain offset.

Figure 3:
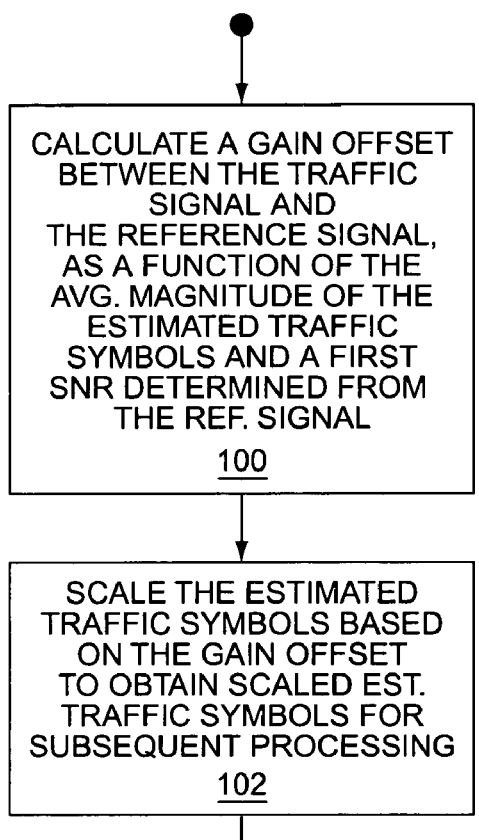
FIG. 3 is a logic flow diagram of one embodiment of gain offset calculations that can be implemented by a gain compensation circuit.

FIG. 3 broadly illustrates processing flow logic for one or more embodiments of the gain compensation circuit 52. In operation, the gain compensation circuit 52 calculates an estimate of the gain offset between the reference signal and traffic signal as a function of a "first" signal-to-noise ratio (SNR) that is determined from the reference signal, and the average magnitude of the estimated traffic symbols (Step 100). With the gain offset thus estimated, processing continues with scaling the estimated traffic symbols to obtain scaled estimated traffic symbols, which are then provided for subsequent signal processing, e.g., decoding to recover their encoded information bits (Step 102).

The above gain offset estimation process, which is detailed immediately below, represents a comparatively straightforward set of associated computations that do not impose significant additional overhead relative to the computations being carried out for RAKE processing the received traffic signal. Perhaps more advantageously, the estimation process does not rely on "default" or assumed parameters relating the reference and traffic signals. Indeed, the calculations depend on values generated directly or indirectly from the reference signal.

Figure 4:
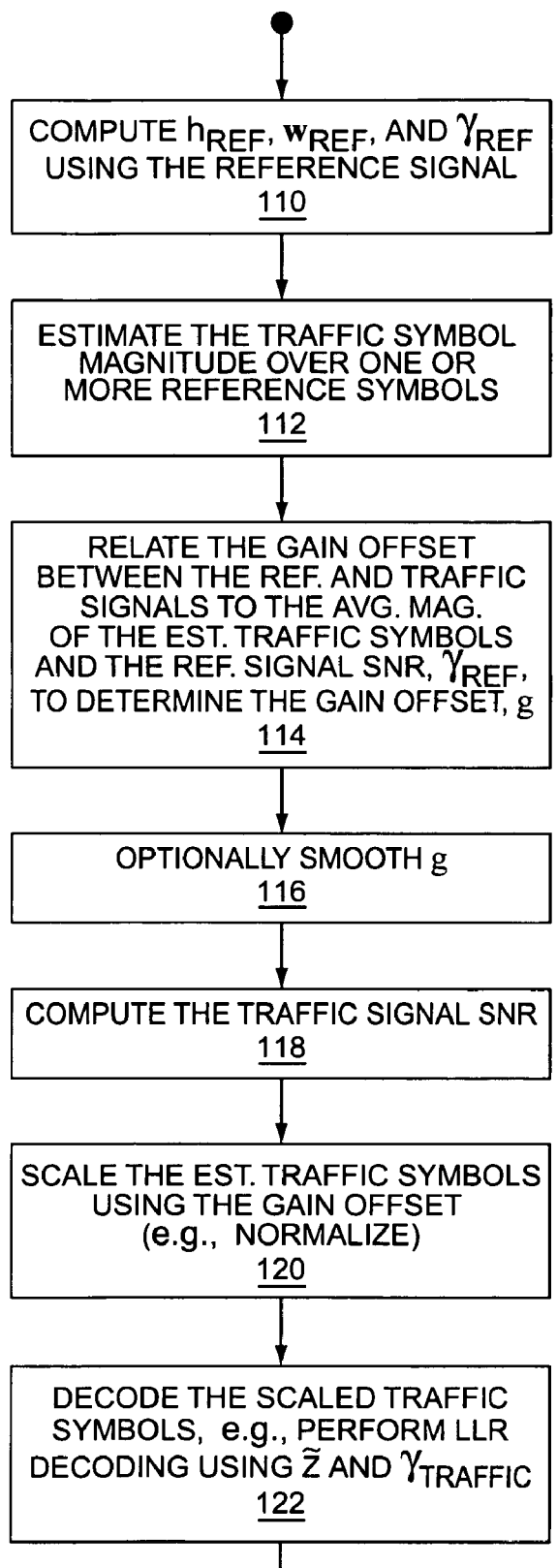
FIG. 4 is a logic flow diagram of one embodiment of overall received signal processing, including gain offset calculations, that may be implemented by the wireless communication receiver of FIG. 1, for example.

FIG. 4 illustrates overall received signal processing details for the receiver circuit 16, wherein processing of the received traffic signal includes generating a channel estimate from the reference signal, $h_{REF}$, generating soft combining weights from the reference signal, $W_{REF}$, and generating a first signal-to-noise ratio (SNR), $Y_{REF}$, from the reference signal (Step 110). In elaborating these initial processing operations, it should be understood that channel estimation may be carried out according to any number of different methods known by those skilled in the art.

Calculation of the soft combining weights, $w_{REF}$, may be based on the general expression, $$w_{REF} = R^{-1} h_{REF},$$

where the matrix R comprises a noise correlation matrix (for G-RAKE processing with interference and noise suppression), or comprises a diagonal matrix of the noise powers (for RAKE+ processing with noise suppression). Those skilled in the art may refer to the previously identified published applications to Wang and Bottomley for examples of G-RAKE processing, or may make use of other weight generation methods as needed or desired.

Finally, calculation of the reference signal's SNR may be accomplished by the receiver circuit 16 according to the expression, $$\gamma_{REF} = w_{REF}^H h_{REF} = \frac{\gamma_{TRAFFIC}}{g^2},$$

where the variable "g" represents the unknown gain offset between the reference and traffic signals that is to be determined by the gain compensation circuit 52. It should be understood that other SNR and/or SINR calculations are contemplated herein.

Concurrent with one or more of the above processing operations, or subsequent to such operations, the receiver circuit 16 calculates an estimate of the traffic symbols received in the traffic symbol over one or more reference symbols (Step 112), e.g., over one or more pilot symbol periods in a W-CDMA or cdma2000 embodiment of the wireless communication receiver 10. By way of non-limiting example, the estimated traffic symbol(s), ẑ, may be generated as a function of the soft combining weights and the channel estimate, both of which are determined from the reference signal on an ongoing basis. One such expression is given as, $$\hat{z} = w_{REF}^H y = w_{REF}^H h_{REF} s + w_{REF}^H n,$$

where $w_{REF} = R^{-1} h_{REF}$ and n account for interference and noise, the vector y represents the despread value(s) of the received traffic signal, and s is the transmitted traffic symbol.

To properly scale the soft value information embodied in the estimated traffic symbols, the gain compensation circuit 52 generates an estimate of the gain offset based on relating it to the average magnitude of the estimated traffic symbols and the reference signal SNR, $\gamma_{REF}$ (Step 114). In one embodiment, relating those values comprises estimating the gain offset, g, based on an expression given as, $$\hat{g} = \sqrt{\frac{E\{\hat{z}\hat{z}^*\} - \gamma_{REF}}{|\gamma_{REF}|^2}},$$

where the expected value function, $E\{\hat{z}\hat{z}^*\}$, represents the average magnitude of the estimated traffic symbols before scaling. A method for obtaining $E\{\hat{z}\hat{z}^*\}$ is given by, $$E\{\hat{z}\hat{z}^*\} = \frac{1}{N} \sum_{k=0}^{N-1} \hat{z}(k)\hat{z}^*(k),$$

where N represents a convenient averaging interval measured in traffic symbol times. Ideally, N is related to the Doppler frequency, but its value also can be fixed for implementation efficiency.

With an updated estimate ĝ of the gain offset g thus available, the gain compensation circuit 52 optionally may be configured to smooth the gain offset value based on some form of filtering (Step 116). By way of non-limiting example, the gain offset g may be maintained as a smoothed value based on an exponential filtering expression given as, $$g(n) = \lambda g(n-1) + (1-\lambda)\hat{g}.$$

where n represents a calculation interval, such as one reference signal symbol period, and where the smoothing factor λ is defined as a number within the range given by $0 \leq \lambda \leq 1$.

Processing continues with the computation of a second SNR value, with this second SNR value being determined for the traffic signal, rather than for the reference signal, as was done with the first computed SNR (Step 118). One example of a traffic signal SNR computation is given as, $$\gamma_{TRAFFIC} = g^2 \gamma_{REF}.$$

The traffic signal SNR computation may be implemented by the gain compensation circuit 52, or by another element within the receiver circuit 16. (Note that in embodiments of the receiver circuit 16 where the traffic signal SNR is not used in decoding the estimated traffic symbols, this step may be skipped.)

Regardless of such details, the gain compensation circuit 52 uses the calculated gain offset, g, to generate scaled estimated traffic symbols (Step 120). While the gain compensation circuit 52 can be configured to implement a variety of gain scaling functions, in at least one embodiment, the gain compensation circuit 52 outputs scaled estimated traffic symbols, $\tilde{z}$, by normalizing the estimated traffic symbol(s), $\hat{z}$, according to the following expression, $$\tilde{z} = \frac{g\hat{z}}{\gamma_{REF}}.$$

The scaled estimated traffic symbols can then be provided to the decoding circuit 54, whose performance is thereby improved by the proper scaling of the soft value information embodied in the scaled estimated traffic symbols (Step 122). In a turbo decoder implementation of the decoding circuit 54, the scaled estimated traffic symbols are decoded to obtain traffic signal data (i.e., the original information bits included in the transmitted traffic signal) based on Log-Likelihood-Ratio (LLR) processing, which also makes use of the traffic signal SNR computed in Step 118. By way of non-limiting example, an expression for determining the jth bit, $b_j$, is given as, $$LLR(b_j) = \gamma_{TRAFFIC} \left[ \begin{array}{c} \max_{s_i \in s_0(j)} (2Re(s_i^* \tilde{z}) - |s_i|^2) - \\ \max_{s_i \in s_1(j)} (2Re(s_i^* \tilde{z}) - |s_i|^2) \end{array} \right],$$

where $s_i$ represents one of the defined modulation symbols in the modulation constellation used for the traffic signal.

Of course, those skilled in the art will appreciate that the above decoding example represents a non-limiting embodiment traffic signal decoding as practiced in the wireless communication receiver 10. Indeed, the present invention is not limited to particular decoding embodiments, or to particular methods of channel estimation, soft combining weight generation, etc. Broadly, the present invention comprises a method and apparatus for calculating a gain offset between an (amplitude-modulated) traffic signal and reference signal, based on relating the gain offset to values known or derived from the reference signal, such as by expressing the gain offset as a function of the average magnitude of estimated traffic symbols and a reference signal SNR. As such, the present invention is not limited by the foregoing details, nor is it limited by the accompanying drawings. Rather, the present invention is limited only by the following claims and their legal equivalents.

What is claimed is:

1. A method of processing an amplitude-modulated traffic signal at a wireless communication receiver comprising:
   calculating a gain offset between the traffic signal and a reference signal received in association with the traffic signal, as a function of the average magnitude of estimated traffic symbols and a first signal-to-noise ratio determined from the reference signal; and
   scaling the estimated traffic symbols based on the gain offset to obtain scaled estimated traffic symbols for subsequent processing;
   wherein scaling the estimated traffic symbols based on the gain offset to obtain scaled estimated traffic symbols comprises normalizing the estimated traffic symbols based on a ratio of the gain offset and the first signal-to-noise ratio.

2. The method of claim 1, further comprising generating the estimated traffic symbols for the traffic signal by combining despread values of the traffic signal using soft combining weights.

3. The method of claim 1, further comprising generating the estimated traffic symbols for the traffic signal based on:
   determining channel estimates and noise correlations from the reference signal;
   generating soft combining weights as a function of the noise correlations and channel estimates; and
   combining despread values of the traffic signal taken over one or more symbol times of the reference signal using the soft combining weights to obtain the estimated traffic symbols.

4. The method of claim 1, further comprising calculating the first signal-to-noise ratio as a function of soft combining weights and a channel estimate determined from the reference signal.

5. The method of claim 1, wherein calculating a gain offset between the traffic signal and a reference signal received in association with the traffic signal, as a function of the average magnitude of estimated traffic symbols and a first signal-to-noise ratio determined from the reference signal comprises expressing the gain offset as the square root of a difference value divided by the first signal-to-noise ratio squared, said difference value calculated as the average magnitude of the estimated traffic symbols minus the first signal-to-noise ratio.

6. The method of claim 1, further comprising smoothing the gain offset.

7. The method of claim 1, further comprising processing the scaled estimated traffic symbols to obtain traffic signal data based on calculating a second signal-to-noise ratio for the traffic signal as a function of the gain offset and the first signal-to-noise ratio, and decoding the scaled estimated traffic symbols based at least in part on the second signal-to-noise ratio.

8. The method of claim 7, wherein decoding the scaled estimated traffic symbols based at least in part on the second signal-to-noise ratio comprises computing log-likelihood ratios for information bits encoded in the scaled estimated traffic symbols as a function of the second signal-to-noise ratio.

9. The method of claim 1, further comprising processing the scaled estimated traffic symbols to obtain traffic signal data based on log-likelihood processing of the scaled estimated traffic symbols.

10. The method of claim 1, further comprising generating the estimated traffic symbols based on Generalized Rake (G-RAKE) combining weights, and wherein calculating a gain offset between the traffic signal and a reference signal received in association with the traffic signal includes calculating the first signal-to-noise ratio as a function of the G-RAKE combining weights and a channel estimate determined from the reference signal.

11. A wireless communication receiver configured to process an amplitude-modulated traffic signal, said receiver comprising one or more processing circuits configured to:

calculate a gain offset between the traffic signal and a reference signal received in association with the traffic signal, as a function of the average magnitude of estimated traffic symbols and a first signal-to-noise ratio determined from the reference signal; and scale the estimated traffic symbols based on the gain offset to obtain scaled estimated traffic symbols for subsequent processing;

wherein the receiver is configured to scale the estimated traffic symbols by normalizing the estimated traffic symbols based on a ratio of the gain offset and the first signal-to-noise ratio.

12. The receiver of claim 11, wherein the receiver is configured to generate the estimated traffic symbols for the traffic signal by combining despread values of the traffic signal using the soft combining weights.

13. The receiver of claim 11, wherein the receiver is configured to generate the estimated traffic symbols for the traffic signal by determining channel estimates and noise correlations from the reference signal, generating the soft combining weights as a function of the channel estimates and noise correlations, and combining despread values of the traffic signal taken over one or more symbol times of the reference signal using the soft combining weights to obtain the estimated traffic symbols.

14. The receiver of claim 11, wherein the receiver is configured to calculate the first signal-to-noise ratio as a function of soft combining weights and a channel estimate determined from the reference signal.

15. The receiver of claim 11, wherein the receiver is configured to calculate the gain offset between the traffic signal and the reference signal based on expressing the gain offset as the square root of a difference value divided by the first signal-to-noise ratio squared, said difference value calculated as the average magnitude of the estimated traffic symbols minus the first signal-to-noise ratio.

16. The receiver of claim 11, wherein the receiver is configured to smooth the gain offset.

17. The receiver of claim 11, wherein the receiver is configured to calculate a second signal-to-noise ratio for the traffic signal as a function of the gain offset and the first signal-to-noise ratio, and decode the scaled estimated traffic symbols based at least in part on the second signal-to-noise ratio.

18. The receiver of claim 17, wherein the receiver is configured to decode the scaled estimated traffic symbols by computing log-likelihood ratios for information bits encoded by the scaled estimated traffic symbols as a function of the second signal-to-noise ratio.

19. The receiver of claim 11, wherein the receiver is configured to obtain information bits from the scaled estimated traffic symbols based on log-likelihood processing of the scaled estimated traffic symbols.

20. The receiver of claim 11, wherein the receiver comprises a noise-canceling RAKE receiver circuit configured to output the estimated traffic symbols based on combining despread values of the traffic signal according to soft combining weights, and wherein the one or more processing circuits comprise a gain compensation circuit configured to compensate the estimated traffic symbols output by the RAKE receiver circuit.

21. The receiver of claim 11, wherein the receiver comprises an interference-canceling RAKE receiver circuit configured to output the estimated traffic symbols based on combining despread values of the traffic signal according to soft combining weights, and wherein the one or more processing circuits comprise a gain compensation circuit configured to compensate the estimated traffic symbols output by the RAKE receiver circuit.

22. The receiver of claim 11, wherein the receiver comprises a Generalized Rake (G-RAKE) receiver.

23. The receiver of claim 11, wherein the one or more processing circuits comprise a gain compensation circuit that is configured to calculate the gain offset and scale the estimated traffic symbols based on the gain offset to obtain the scaled estimated traffic symbols.

* * * * *

UNITED STATES PATENT AND TRADEMARK OFFICE
CERTIFICATE OF CORRECTION

PATENT NO. : 7,668,226 B2  Page 1 of 1
APPLICATION NO. : 11/064351
DATED : February 23, 2010
INVENTOR(S) : Cairns It is certified that error appears in the above-identified patent and that said Letters Patent is hereby corrected as shown below:

In Column 5, Line 52, delete "$Y_{REF}$," and insert -- $\gamma_{REF}$, --, therefor.

Signed and Sealed this

Sixth Day of July, 2010

David J. Kappos
*Director of the United States Patent and Trademark Office*